US012558866B2

(12) United States Patent
Bergner et al.

(10) Patent No.: US 12,558,866 B2
(45) Date of Patent: Feb. 24, 2026

(54) LINER FOR UPHOLSTERED FURNITURE

(71) Applicant: Inter IKEA Systems B.V., Delft (NL)

(72) Inventors: Anders Bergner, Halmstad (SE); Gerd Rohde, Lonnsboda (SE)

(73) Assignee: Inter IKEA Systems B.V., Ln Delft (NL)

( * ) Notice: Subject to any disclaimer, the term of this patent is extended or adjusted under 35 U.S.C. 154(b) by 169 days.

(21) Appl. No.: 18/049,840

(22) Filed: Oct. 26, 2022

(65) Prior Publication Data

US 2023/0068055 A1      Mar. 2, 2023

Related U.S. Application Data

(63) Continuation of application No. 15/312,676, filed as application No. PCT/EP2015/061224 on May 21, 2015, now abandoned.

(30) Foreign Application Priority Data

May 21, 2014    (SE) .................................... 1450610-9

(51) Int. Cl.
| | |
|---|---|
| *B32B 5/06* | (2006.01) |
| *A47C 31/10* | (2006.01) |
| *A47C 31/11* | (2006.01) |
| *B32B 3/26* | (2006.01) |
| *B32B 5/02* | (2006.01) |
| *B32B 5/26* | (2006.01) |
| *B32B 37/06* | (2006.01) |
| *B32B 38/04* | (2006.01) |
| *B68G 7/02* | (2006.01) |
| *B68G 11/03* | (2006.01) |
| *D04H 1/435* | (2012.01) |
| *D04H 1/485* | (2012.01) |
| *D04H 1/498* | (2012.01) |
| *D04H 1/541* | (2012.01) |
| *D04H 1/55* | (2012.01) |
| *D04H 1/559* | (2012.01) |
| *D04H 1/732* | (2012.01) |
| *D04H 1/74* | (2006.01) |

(52) U.S. Cl.
CPC .............. *B32B 5/06* (2013.01); *A47C 31/105* (2013.01); *A47C 31/11* (2013.01); *B32B 3/266* (2013.01); *B32B 5/02* (2013.01); *B32B 5/022* (2013.01); *B32B 5/26* (2013.01); *B32B 37/06* (2013.01); *B32B 38/04* (2013.01); *B68G 7/02* (2013.01); *B68G 11/03* (2013.01); *D04H 1/435* (2013.01); *D04H 1/485* (2013.01); *D04H 1/498* (2013.01); *D04H 1/5412* (2020.05); *D04H 1/5418* (2020.05); *D04H 1/55* (2013.01); *D04H 1/559* (2013.01); *D04H 1/732* (2013.01); *D04H 1/74* (2013.01); *B32B 2038/047* (2013.01); *B32B 2250/20* (2013.01); *B32B 2262/0276* (2013.01); *B32B 2262/12* (2013.01); *B32B 2307/304* (2013.01); *B32B 2307/3065* (2013.01); *B32B 2307/718* (2013.01); *B32B 2601/00* (2013.01)

(58) Field of Classification Search
CPC ........... A47C 31/10; A47C 31/11; B32B 3/26; B32B 37/06; B32B 38/04; B32B 5/02; B32B 5/06; B32B 5/26; B32B 27/02; B32B 27/12; B32B 27/36; B32B 3/24; B68G 11/03; B68G 7/02; D04H 1/435; D04H 1/485; D04H 1/498; D04H 1/541; D04H 1/55; D04H 1/559; D04H 1/732; D04H 1/74
See application file for complete search history.

(56) References Cited

U.S. PATENT DOCUMENTS

| | | | |
|---|---|---|---|
| 4,696,850 | A | 9/1987 | Jost et al. |
| 5,486,166 | A | 1/1996 | Bishop et al. |
| 5,840,634 | A | 11/1998 | Chamberlin et al. |
| 5,951,798 | A | 9/1999 | Schmidt et al. |
| 6,273,978 | B1 | 8/2001 | Tai |
| 6,596,658 | B1 | 7/2003 | Putnam et al. |
| 7,132,022 | B2 | 11/2006 | Ogle et al. |
| 2003/0068943 | A1 | 4/2003 | Fay |
| 2003/0124937 | A1* | 7/2003 | Williams ................. D04H 1/54 442/327 |
| 2004/0071947 | A1 | 4/2004 | Hwang et al. |
| 2006/0121811 | A1 | 6/2006 | Mangold et al. |
| 2006/0230589 | A1 | 10/2006 | Christensen |
| 2009/0214846 | A1 | 8/2009 | Kalbe |
| 2011/0311795 | A1 | 12/2011 | Bartl et al. |
| 2013/0112499 | A1* | 5/2013 | Kitchen ................... B32B 5/26 181/296 |

FOREIGN PATENT DOCUMENTS

| | | |
|---|---|---|
| CN | 103030091 A | 4/2013 |
| DE | 9003864 U1 | 9/1990 |
| | (Continued) | |

OTHER PUBLICATIONS https://www.merriam-webster.com/dictionary/furniture (Year: 2024).*

(Continued)

*Primary Examiner* — Lynda Salvatore
(74) *Attorney, Agent, or Firm* — Renner, Otto, Boisselle & Sklar, LLP

(57)       ABSTRACT

A liner, comprising a layered material in which a carded nonwoven wadding is thermally bonded to a thin carded nonwoven top layer, for upholstered furniture. In the liner, a high proportion of the staple fibers in the top layer are thin bi-component binder fibers. Further, at least 20 wt % of the staple fibers in the wadding is thick staple fibers. Furthermore, also the wadding comprises bi-component binder fibers.

21 Claims, No Drawings

(56)                    References Cited

FOREIGN PATENT DOCUMENTS

| | | | |
|---|---|---|---|
| DE | 4407097 | A1 | 9/1995 |
| DE | 19604726 | A1 | 8/1997 |
| DE | 19738433 | A1 | 4/1998 |
| DE | 19804418 | A1 | 8/1999 |
| EP | 0831162 | A1 | 3/1998 |
| GB | 2396360 | A | 6/2004 |
| GB | 2405646 | A | 3/2005 |
| RU | 2162905 | C2 | 2/2001 |
| WO | 2001068341 | A1 | 9/2001 |
| WO | 2003013409 | A1 | 2/2003 |
| WO | 2005111288 | A1 | 11/2005 |
| WO | 2005111289 | A1 | 11/2005 |
| WO | 2006020633 | A1 | 2/2006 |
| WO | 2006068922 | A1 | 6/2006 |
| WO | 2007061423 | A1 | 5/2007 |
| WO | 2008005936 | A2 | 1/2008 |

OTHER PUBLICATIONS

International Search Report for corresponding International Application No. PCT/EP2015/061224 mailed Jul. 3, 2015.
Written Opinion of the International Searching Authority for corresponding International Application No. PCT/EP2015/061224 mailed Jul. 3, 2015.

* cited by examiner

LINER FOR UPHOLSTERED FURNITURE

This application is a continuation of U.S. application Ser. No. 15/312,676, filed Nov. 21, 2016, which is a national phase of International Application No. PCT/EP2015/061224 filed May 21, 2015, which claims priority to Swedish Application No. 1450610-9 filed May 21, 2014.

FIELD OF THE INVENTION

The present invention relates to a liner for upholstered furniture or mattresses, the liner comprising a carded nonwoven wadding. Further the invention relates to upholstered furniture or mattresses comprising such a liner.

BACKGROUND

Nonwovens are used in various applications in the art. Nonwoven fabric is a fabric-like material made from long fibers, bonded together by chemical, mechanical, heat or solvent treatment. The term is used in the textile manufacturing industry to denote fabrics, such as felt, which are neither woven nor knitted. Nonwovens are defined by ISO standard 9092 and CEN EN 29092. Recently EDANA and INDA have proposed the following of nonwoven to the International Standardization Organization: "A nonwoven is a sheet of fibers, continuous filaments, or chopped yarns of any nature or origin, that have been formed into a web by any means, and bonded together by any means, with the exception of weaving or knitting. Wetlaid webs are nonwovens provided they contain a minimum of 50% of man-made fibres or other fibres of non vegetable origin with a length to diameter ratio equals or superior to 300, or a minimum of 30% of man-made fibres with a length to diameter ratio equals or superior to 600, and a maximum apparent density of 0.40 g/cm$^3$."

Upholstered furniture commonly uses a carded nonwoven, often described as wadding or batting, on top of the major comfort material (i.e. polyurethane foam, pocket springs or other flexible materials/constructions and/or on top of frame components for giving desired deformation, flexibility and support) for improving comfort parameters. This carded wadding is commonly between 100 to 400 gram/m$^2$ (gsm), but can be significantly lighter or heavier in some applications, and consist in most cases of carded, bonded fibers of thermoplastic polyesters. Typically, the wadding comprises a blend of two different kinds of fibers where one of them, a core-sheath binder fiber, has a core-sheath configuration with a co-polymerized sheath with a significantly lower melting point compared to the core. Typically, other fibers in wadding are selected to have a significantly higher melting point compared to the sheath. The carded fibers are thermally bonded by heating the fibers to melt the sheath layer of the fibers with core-sheath configuration, whereby the fibers are bonded once the sheath layer solidifies.

The wadding is commonly glued (chemical bonded) towards the main comfort material (PU-foam etc.), but can also be adhered using thermal bonding (melting and solidifying of a thermoplastic component), mechanical anchoring by any means, e.g. stitching, or a combination of two or more of these techniques.

In order to protect the wadding from wear and tear and reduce friction between the wadding and the furniture cover (fabric/leather/suede etc.) a thin and flexible fibrous material, e.g. a nonwoven or a textile, with low friction is placed on top of the wadding as an intermediate layer.

A common low-cost material for use as intermediate layer is a meltspun nonwoven of polypropylene (PP), typically a spunbonded and point bonded/calendered PP of 40 to 800 gsm, but other polymers, bonding principles and surface weights are also in use.

It is important that the intermediate layer does not affect deformation, flexibility, and support of the wadding to a great extent, as this in turn may affect comfort parameters of the upholstered furniture; especially the intermediate layer should not be rustling to allow for noiseless deformation Therefore, the intermediate layer, such as a spunbonded and point bonded/calendered PP, is commonly not bonded to the wadding, but typically used as separate layer.

Besides acting as protection from wear and tear, the intermediate layer facilitates convenient assembly of slip-covers and prevents the wadding from being deformed during assembly of the cover. The advantage is both during production, in order to reduce assembly time for a factory assembled cover, but also when the cover shall be removed for washing and re-assembled by customers or when the furniture is sold with slip-on covers for customer assembly.

One major disadvantages of using a separate liner, i.e. an intermediate layer, on top of the wadding is the additional time and cost during production. Further, the intermediate layer typically has to be stitched to the correct shape before assembling the furniture, without or with the cover.

At least some of the disadvantages of using a separate liner, i.e. an intermediate layer, could in principle be overcome by laminating the wadding and the meltspun nonwoven intermediate layer together in order to have a single layer, i.e. a liner, when assembling the furniture. However, common lamination processes using glues and/or thermal bonding systems (cf. DE 4407097 and U.S. Pat. No. 5,951, 798) will inherently increase the stiffness of the material, whereby the comfort parameters of the upholstered furniture are reduced. Furthermore, the assembly of the upholster furniture becomes more difficult. In addition, the laminating the wadding and the meltspun nonwoven intermediate layer to a single liner, adds an additional separate process.

Thus, there is a need for a cost-efficient way of providing a liner not suffering from the above mentioned drawbacks.

SUMMARY

Consequently, the present invention seeks to mitigate, alleviate, eliminate or circumvent one or more of the above identified deficiencies in the art and disadvantages singly or in any combination by providing a liner for upholstered furniture, the liner comprising a layered material with at least two layers, in which layered material a carded nonwoven wadding, constituting a first layer, is thermally bonded to a carded nonwoven top layer, constituting a second layer. The wadding has a thickness of 4 to 140 mm, and a weight of 50 to 2800 g/m$^2$. At least 20 wt % of the staple fibers in the wadding has a linear mass density of at least 6 dtex, and 5 to 40 wt % of the staple fibers in the wadding are bi-component binder fibers. The top layer has a thickness of 0.05 to 4 mm, and a weight of 20 to 120 g/m$^2$. At least 90 wt % of the staple fibers in the top layer has a linear mass density of 5 dtex or less, and 50 wt % to 100 wt % of the staple fibers in the top layer are bi-component binder fibers. Preferably, the thickness of the wadding is at least 2 times, e.g. at least 5 times, the thickness of the top layer.

In such a liner, the first layer, i.e. the wadding, provides "comfort wadding properties", and the second layer, i.e. the top layer, provides properties similar to the ones provided by a meltspun nonwoven. The two layers are provided as parts of a single structure in contrast to solutions in the art, wherein a separate intermediate meltspun nonwoven typically is used in between a separate wadding and the cover. Further, the present liner may be obtained via a single process, dispensing with the need for obtaining the wadding and the top layer, respectively, in separate processes.

According to a further aspect of the invention there is provided an upholstered piece of furniture having such a liner arranged at least partly over the comfort material of the piece of furniture.

According to yet a further aspect of the invention there is provided a process for providing such a liner. Such a process comprising the steps of:

carding staple fibers, wherein at least 20 wt % of the staple fibers have a linear mass density of at least 6 dtex, and 5 to 40 wt % of the staple fibers are bi-component binder fibers, to provide a first carded continuous web;

carding staple fibers having a linear mass density of 5 dtex or less, wherein 50 to 100 wt % of the staple fibers are bi-component binder fibers, to provide a second carded continuous web;

arranging the first and second carded continuous webs into a first and second layer on top of each other to provide a layered structure;

heating the layered structure to form an liner having a nonwoven wadding thermally bonded to a nonwoven top layer, wherein said wadding has a thickness of 4 to 140 mm, and a weight of 50 to 2800 g/m²; and said top layer has a thickness of 0.05 to 2 mm, and a weight of 20 to 120 g/m². The thickness of the wadding is preferably at least 2 times, e.g. at least 5 times, the thickness of the top layer.

Further advantageous features of the invention are elaborated in embodiments disclosed herein. In addition, advantageous features of the invention are defined in the dependent claims.

DETAILED EMBODIMENTS

As explained above, bonding a spunbonded nonwoven on top of a nonwoven wadding will negatively affect the comfort parameters of wadding provided when used in upholstered furniture. Further, it will require additional processing.

In order to provide a single material for use as liner in upholstered furnitures there is, according to an embodiment, provided a liner comprising a layered material with at least two layers. The first layer is a carded, thermally bonded nonwoven wadding and the second layer is a carded, thermally bonded nonwoven top layer. In use the wadding is intended to face the comfort material (e.g. PU-foam), such as the comfort material of a piece of upholstered furniture, or a mattress, and the top-layer is intended to face the cover. The carded nonwoven wadding is thermally bonded to a carded nonwoven top layer, by means of bi-component binder fibers, e.g. core-sheath binder fibers or side-by-side binder fibers, present in the wadding and the top layer, respectively. As known in the art, bi-component fibers are fibers comprising two polymers of different chemical and/or physical properties. Bi-component binder fibers are bi-component fibers having a binder portion with lower melting point than the other portion. In core-sheath binder fibers the sheath has lower melting point than the core. Core-sheath binder fibers have the advantage of having good binding properties, as the binder portion, i.e. the sheath, surround the entire fiber, thereby maximizing the contact surface with other fibers in the web. The liner layer may be placed between a cover and a comfort material in upholstered furniture, mattresses and other related upholstered objects to replace a separate wadding and intermediate layer. In such use, the wadding will face the comfort material, while the top layer will face the cover.

Typically, a carded nonwoven has properties significantly different from the ones of a spunbonded nonwoven, whereby carded nonwovens not are suitable as intermediate layer on top of the wadding in upholstered furniture. It was however realized that by a high proportion of the staple fibers being bi-component binder fibers, e.g. core-sheath binder fibers, and by a high proportion of the staple fibers being thin staple fibers, a thermally bonded carded nonwoven, having properties, in terms of flexibility, friction, and rustle, resembling the ones of spunbonded nonwovens may be provided. In order to provide such a thermally bonded spunbond like carded nonwoven 50 wt % (weight percent) to 100 wt %, such as 70 wt % to 100 wt %, or 85 wt % to 95 wt %, of the staple fibers should be bi-component binder fibers, e.g. core-sheath binder fibers. While all the staple fibers may be bi-component binder fibers, e.g. core-sheath binder fibers, it may be advantageous to include some staple fibers not being bi-component binder fibers to facilitate the carding of the staple fibers. Further, at least 90 wt %, preferably at least 95 wt %, of the staple fibers should be staple fibers with a linear mass density of 5 dtex or less, preferably 4 dtex or less, more preferably 3 dtex or less. If staple fibers not being bi-component binder fibers are present, they should preferably be really thin, i.e. have linear mass density of 2 dtex or less, such as 1 dtex or less. A thicker staple fiber not being a bi-component binder fiber will provide too much resilience to the top layer for some applications. Further, thicker fibers will provide a too stiff layer, preventing collapsing of the web into a thin, strong and bending flexible spunbond like layer upon thermal binding.

The bending and buckling stiffness of the top layer may be reduced by perforating the top layer. According to one embodiment, the top layer is perforated. Perforation may be achieved by using a pinned sleeve. Further, perforation may be achieved by needle punching. Higher degree of perforation may be achieved by needle punching. Perforation is of special interest in embodiments using a high proportion, such as more than 50 wt %, of staple fibers having a linear mass density of more than 4 dtex. Further, also if using a high proportion, such as more than 50 wt %, of staple fibers having linear mass density of more than 3 dtex, perforation may be preferred.

As known by the skilled person decitex (dtex) is a measure of the linear mass density mass for fibers. Dtex is the mass in grams per 10,000 meters.

Upon heating such a combination of thin staple fibers, with a high proportion of bi-component binder fibers, e.g. core-sheath binder fibers, to melt the binder portion, the staple fibers will collapse into a dense carded nonwoven having properties suitable for use as a layer on top of a wadding in a liner for upholstered furniture. Not only is a high proportion of bi-component binder fibers, e.g. core-sheath binder fibers, necessary to provide a dense nonwoven, but also the use of fairly thin staple fibers. Further, the staple fibers in the top layer are typically non-crimped/straight or mechanically crimped in zigzag geometry. Staple fibers crimped in helical geometry, i.e. conjugated fibers are less preferred in the top layer. According to an embodiment, the top layer comprises essentially no conjugated fibers.

Typically the linear mass density of the staple fibers will be at least 0.5 dtex. Thus, the linear mass density of the staple fibers in the top layer may be 0.5 to 5 dtex, such as 0.5 to 4 dtex, or 0.7 to 2 dtex. Normally, the staple fibers in the top layer have an average fiber length between 30 and 100 mm.

According to an embodiment, the staple fibers in the top layer comprise core-sheath polyester binder fibers having a linear mass density of 5 dtex or less, such as 4 dtex or less. If less than 100 wt % of the staple fibers are core-sheath polyester binder fibers, the staple fibers in the top layer may also comprise fibers of polyester, or copolymers thereof having a linear mass density of 5 dtex or less, such as 4 dtex or less. If present, the fibers of polyester, or copolymers, thereof have a melting point of more than 200° C., e.g. about 260° C. Similarly, also the melting point of the core of the core-sheath polyester binder fibers is higher than 200° C., e.g. about 260° C. Further, the sheath of the core-sheath polyester binder fibers have a melting point of less than 200° C., e.g. about 110° C. The melting point of the polyester sheath may be lowered by co-polymerization with olefin groups, reducing the melting point significantly, e.g. to about 110° C. Preferably, the melting point of the sheath of the core-sheath polyester binder fiber is at least 50° C. lower, such as at least 75° C. lower, or even at least 100° C. lower, than the melting point of the core. Similarly, the melting point of the sheath of the core-sheath polyester binder fiber is at least 50° C. lower, such as at least 75° C. lower or even at least 100° C. lower, than the melting point of the fibers of polyester, or copolymers thereof, if present.

In an embodiment wherein the staple fibers in the top layer comprise core-sheath polyester binder fibers and optionally fibers of polyester, or copolymers thereof, at least 80 wt %, such as at least 90 wt % of the staple fibers may be core-sheath polyester binder fibers and fibers of polyester, or copolymers thereof.

The polyester may be PET (polyethylene terephthalate), PBT (polybutylene terephthalate), PTT (polytrimethylene terephthalate), PLA (polylactic acid), PEF (polyethylene furanoate). In order to provide specific properties, such as low melting point for thermal bonding, improved fire retardant properties, increased elasticity and recovery after deformation etc. the polyester may be a co-polymer, such as block co-polymer. As an example, a block co-polymer comprising polyester and polyolefin blocks have lower melting point compared to the corresponding polyester. Further, the polyester compound may comprise additives and/or additional polymers to provide the compound with specific properties.

Further, it was realized that a carded nonwoven spunbond like top layer could by thermally bond to a carded nonwoven wadding in single step, if bi-component binder fibers, e.g. core-sheath binder fibers, are present in both layers. Although the isolated cost for a carded nonwoven top layer will be higher than for a spunbonded nonwoven one, the overall cost for the resulting upholstered furniture will be lower as the number of steps in assembling the upholstered furniture will be reduced, i.e. the production will be facilitated.

In the art, liners wherein spunbonded polypropylene non-wovens are attached to non-woven waddings by use of an adhesive, i.e. melt glue, are known. However, no process is known in the art, wherein staple fibers of various kinds are converted into a layered material comprising two different types of non-woven, one dense and one fluffy, in a single process. Typically, the two different non-wovens are produced in separates processes to be attached to each other thereafter in a separate process. The liner disclosed herein thus not only facilities the assembly of the upholstered furniture, but also the production of liners in which the top layer is to be attached to the wadding.

As mentioned, the wadding of the present liner is fluffy while the top-layer is dense. According to an embodiment, the wadding has a density of 5 to 20 kg/m$^3$ whereas the density of the top layer is higher. The density of the top layer may be 40 to 400 kg/m$^3$, such as 100 to 400 kg/m$^3$. This combination of two layers with distinct densities provided the liner with the desired properties.

Thus, a liner comprising a layered material in which carded nonwoven wadding is thermally bonded to a carded nonwoven top layer is obtainable by heating two continuous carded webs comprising bi-component binder fibers, e.g. core-sheath binder fibers, and arranged on top of each other. The webs may or may not be folded one or several times. As already explained, the continuous web to form the top layer will comprise a high proportion of thin staple fibers, and a high proportion of the staple fibers will be bi-component binder fibers, e.g. core-sheath binder fibers.

In those embodiments wherein the top layer comprises somewhat thicker staple fibers, e.g. fibers having a linear mass density more than 3 dtex, it may preferred to further reduce the thickness of the top layer by means of heated calendar(s). While heating a continuous carded web comprising a high proportion of bi-component binder fibers, e.g. core-sheath binder fibers, to a temperature above the melting point of the binder portion of the fibers per se will result in reduction of the thickness of the web, it may still be preferable to further reduce the thickness of the top layer, such as by means of heated calendar(s). Further, the use of heated calendar to affect the top layer may, in addition to reducing its thickness, also smoothen its surface.

As bi-component binder fibers, e.g. core-sheath binder fibers, are present in both carded webs there is no need to add any additional binder. On the contrary, the presence of a separate, additional binder may result in reduced flexibility of the liner. According to an embodiment, the carded nonwoven wadding thus is directly bonded to the carded nonwoven top layer in a bonding process using elevated temperature above the melting point of the binder portion of the bi-component binder fiber, e.g. above the melting point of the sheath of a core-sheath binder fiber.

Further, providing the liner with a third layer with a composition corresponding to the top layer, but at the opposite side of the wadding, be it directly or indirectly attached to the wadding, may also impair the flexibility of the liner, as a sandwich structure will be provided. According to an embodiment, the liner does not comprise any third layer with a composition corresponding to the top layer at the opposite side of the wadding. The liner may according to such an embodiment comprise further layer(s) apart from the wadding and the top layer though.

In order to provide a layered material for use as liner for upholstered furniture, the staple fibers in the continuous web to form the carded nonwoven wadding should be rather thick to provide a high loft, resilience, flexibility and comfort parameters. Thus, at least 20 wt % of the staple fibers in the wadding part of the liner has a linear mass density of at least 6 dtex, such as 7 to 30 dtex, or 8 to 20 dtex. Although a thickness corresponding to up to 30 dtex, the linear mass density of the staple fibers in the wadding commonly are less than 20 dtex. Typically a higher proportion of the staple fibers are thick staple fibers. According to an embodiment, at least 50 wt %, such as at least 75 wt %, of the staple fibers in the wadding has a linear mass density of at least 7 dtex, such as at least 8 dtex. Further, the staple fibers should comprise bi-component binder fibers, e.g. core-sheath binder fibers, whereby a continuous web of such rather thick staple fibers could be thermally bond to form a carded nonwoven wadding upon thermally bonding the carded nonwoven top layer to the carded nonwoven wadding. The amount of the bi-component binder fibers, e.g. core-sheath binder fibers, should be 5 to 40 wt %, such as 10 to 25 wt % or 15 to 20 wt %, of the total amount of staple fibers, i.e. the proportion of bi-component binder fibers should be significantly lower in the carded nonwoven wadding compared to the proportion of bi-component binder fibers in the carded nonwoven top layer. By having not more than 40 wt % bi-component binder fibers, the resulting carded nonwoven is suitable for use as wadding.

Typically, the staple fibers in the wadding have an average fiber length between 30 and 100 mm.

By having such a drastic difference in the amount of bi-component binder fibers, e.g. core-sheath binder fibers, in the two different layers, i.e. the top layer and the wadding, respectively, a layered material with completely different mechanical properties in its layered two layers may be provided, although the layers may consist of the same raw material, e.g. polyester. Further, also the usage of thin staple fibers in the top layer and thick staple fibers in the wadding contributes to the different mechanical properties. As already mentioned, the fluffy wadding may have a density of 5 to 20 kg/m$^3$, whereas the dense top layer may a density of 40 to 400 kg/m$^3$. From a re-cycling perspective, it is a clear advantage if a sandwich structure only comprises one material. Thus, the staple fibers in the top layer as well as in the wadding, according to an embodiment, essentially consist of fibers of polyester, or copolymers thereof, and bi-component binder fibers, e.g. core-sheath polyester binder fibers.

According to an embodiment, the staple fibers in the wadding comprise fibers of polyester, or copolymers thereof, having a linear mass density of at least 6 dtex, such as at least 7 dtex or at least 8 dtex, and core-sheath polyester binder fibers. The fibers of polyester, or copolymers thereof, have a melting point of more than 200° C., e.g. about 260° C. Similarly, also the melting point of the core of the core-sheath polyester binder fibers is higher than 200° C., e.g. about 260° C. Further, the sheath of the core-sheath polyester binder fibers have a melting point of less than 200° C., e.g. about 110° C. Preferably, the melting point of the sheath of the core-sheath polyester binder fiber is at least 50° C. lower, such as 75° C. lower or even 100° C. lower, than the melting point of the core. Similarly, the melting point of the sheath of the core-sheath polyester binder fiber is at least 50° C., such as 75° C. lower or even 100° C. lower, lower than the melting point of the fibers of polyester, or copolymers thereof. In an embodiment wherein the staple fibers in the wadding comprise core-sheath polyester binder fibers and fibers of polyester, or copolymers thereof, at least 80 wt %, such as at least 90 wt %, of the staple fibers may be core-sheath polyester binder fibers and fibers of polyester, or copolymers thereof.

The polyester may be PET (polyethylene terephthalate), PBT (polybutylene terephthalate), PTT (polytrimethylene terephthalate), PLA (polylactic acid), PEF (polyethylene furanoate). In order to provide specific properties, such as low melting point for thermal bonding, improved fire retardant properties, increased elasticity and recovery after deformation etc. the polyester may be a co-polymer, such as block co-polymer. As an example, a block co-polymer comprising polyester and polyolefin blocks have lower melting point compared to the corresponding polyester. Further, the polyester compound may comprise additives and/or additional polymers to provide the compound with specific properties.

Further, in order to provide the wadding with improved resilience, it is preferred if at least 20 wt % of the staple fibers in the wadding are fibers being crimped in helical geometry, i.e. conjugated fibers. Typically, the conjugated fibers have a linear mass density of at least 6 dtex, such as at least 7 dtex or at least 8 dtex.

In the liner, the top layer will typically be thinner than the wadding. Thus, the thickness of the wadding is preferably at least 2 times, such as at least 5 times, at least 8 times, or at least 10 times, the thickness of the top layer. While the top layer may have a thickness of 0.05 to 4 mm, such as 0.1 to 2 mm, the thickness typically is less than 1 mm, e.g. about 0.5 mm, as a thicker layer may affect comfort parameters of the wadding. Further, increasing the thickness of the top layer will also increase the cost, as more material is required. However, a thicker top layer will be more resistant to wear. Thus, the top layer may be between 0.5 and 2 mm in some applications.

In order to provide an even softer and smoother top layer, the top layer may be treated in various ways. As an example the top layer may be sanded, needled, i.e. perforated, or wave pressed. Further, the top layer may be heat printed to provide it with spunbond like pattern, e.g. squares. Heat-printing may also be used to provide the top layer with a given design, such as printing of trademarks on it.

According to an embodiment, the top layer is perforated. The top layer may be perforated subsequent to the thermal bonding process. Various methods for perforating nonwovens are known in the art. As an example, the top layer may be perforated by use of a pinned sleeve. Further, the top layer may be perforated by, e.g., needle punching providing a degree of perforation. Perforation will improve the flexibility of the liner, the higher degree of perforation, the more flexible liner. According to an embodiment, the top layer has at least 20 perforations per cm$^2$, such as at least 30 perforations per cm$^2$ or at least 40 perforations per cm$^2$. However, perforation will also impart the strength of the liner. A too high degree of perforation may thus be less desirable. Accordingly, the top layer may have less than 100 perforations per cm$^2$, such as less than 75 perforations per cm$^2$ or less than 60 perforations per cm$^2$.

In order to provide the liner with a velvet feeling, filling microfibers may be applied over the top layer.

According to an embodiment, the top layer has a thickness of 0.1 to 0.5 mm. The top layer further has a weight of 20 to 120 g/m$^2$, such as 50 to 100 g/m$^2$. On the contrary, the wadding, providing comfort to the upholstered furniture, typically is at least 8 times thicker than the top layer and has a thickness of 4 to 140 mm, such as 4 to 50 mm. The wadding further has weight of 50 to 2800 g/m$^2$, such as 50 to 200 g/m$^2$. While upper limits have been provided for the wadding, in principle any surface basis weight up to the limit for the processing equipment can be used for the wadding.

The overall thickness of the liner may thus be approx. 4 to 140 mm.

According to an embodiment, the thickness of the top layer, the wadding and the liner, respectively, may be determined by standardized methods for determining the thickness of non-wovens in the art. As an example, the thickness of the top layer, the wadding and the liner may respectively be determined according to the ISO method 9073-2:1995 for determining thicknesses of non-wovens. Further, the thickness of the top layer, the wadding and the liner, respectively, may be determined according to the INDA/EDANA method WSP 120.2.R4 (12), being based on a previous ASTM method (D5736). For determining the thickness of the wadding and the liner, the INDA/EDANA method is according to an embodiment preferred.

By using a layered material with at least two layers as described herein, wherein the properties/densities of the two different layers are so different, the material may be used for upholstered furniture for replacing a two layer construction, the top layer fulfilling the pilling, tear strength and flexibility requirements for upholstered furniture. The selection of staple fibers for the top layer, i.e. high proportion of bi-component binder fibers, e.g. core-sheath binder fibers, and the staple fibers being thin is of special importance in providing the liner with the desired properties.

For certain applications, such for use in upholstered furniture with leather cover, it may be advantageous to provide the top layer with a non-slip coating.

As already described typical advantages of the liner described herein compared to two separate layers include:

optimized production of upholstered furniture, as the need for an intermediate layer is eliminated;

improved process economy compared to laminating a meltspun top layer on wadding, which in addition would affect comfort parameters negatively; and reduced industrial waste (edge trimming of roll goods, cutting waste etc.), as waste material may be re-opened and used in the carding process again.

It was further found that the present liner, if having a thickness of at least 4 mm such that the thermal insulation is sufficient, fulfills the fire test procedure for barrier materials in TB 117-2013 from State of California, in contrast to a liner solution wherein meltspun nonwoven of polypropylene is used a separate intermediate layer on top of a carded polyester nonwoven, representing state of the art. This is of great importance as it implies that the need for potentially hazardous flame retardants in the comfort material and/or the cover material in upholstered furniture may be dispensed with. Although fire resistant liners are known in the art, they typically are expensive, reduces flexibility, thus affecting comfort parameters.

In embodiments, wherein the liner is to act as fire retarding material, higher performing fibers may be added to the staple fibers in the top layer and/or the wadding. Examples of such fibers include inherently flame retardant PET (Trevira CS), meta-aramide (Nomex), carbon/carbonised fibers (Panox), or any other high performing fiber with high melting or decomposition temperature and high LOI (Limiting Oxygen Index). Use of oxidized polyacrylonitrile fibers to provide a fire combustion modified batt is known in the art (cf. WO 2001/68341).

The liner produced as a layered material with at least two layers may be applied on furniture by gluing pre-cut sheets of material on the structure or by stitching them together (as a slip on liner) before dressing the structure or comfort core/cushion. In this production step the most obvious advantage is reduction of assembly time replacing two separate materials with the two layer sandwich material. Typical, comfort material for upholstered furniture include cellular polymeric foams, i.e. PU-foam, fibrous structures of man-made or natural fibers, pocket springs, woven or knitted textile fabrics suspended in a frame. As recognized by the skilled person, the liner may also be used as a mattress cover.

A further embodiment, thus relates to an upholstered piece of furniture having a liner, as described herein, arranged at least partly over the comfort material of the piece of furniture. Although not necessary, the liner will typically be attached to the comfort material of the furniture, such as by gluing. It may further be stitched, welded, or taped into a slip on cover. In order to provide upholstered furniture, a cover is normally arranged at least partly over the liner. The cover may be a permanently attached or it may be a slip dress on cover.

A further embodiment relates to a process for providing a liner for upholstered furniture, which liner comprises a layered material with at least two layers, in which a carded nonwoven wadding, constituting a first layer, is thermally bonded to a carded nonwoven top layer, constituting a second layer. The advantageous of such liner has already been described herein above.

In such a process, staple fibers, of which at least 20 wt % have a linear mass density of at least 6 dtex, and wherein 5 to 40 wt % of the staple fibers are bi-component binder fibers, e.g. core-sheath binder fibers, are carded to provide a first carded continuous web. Further, staple fibers having a linear mass density of 5 dtex, such as 4 dtex or less, wherein 50 to 100 wt %, such as 70 to 100 wt %, of the staple fibers are bi-component binder fibers, e.g. core-sheath binder fibers, are carded to provide a second carded continuous web. The different staple fibers may be provided in bales. The bales are opened, scaled and mixed to provide the desired mixture of staple fibers.

The first and second carded continuous webs are then arranged in a first and second layer on top of each other to provide a layered structure. The first layer may comprise just one layer of the first carded continuous web. However, more commonly the first layer will comprise several layers of the first carded continuous web. Such a multilayered first layer is provided by folding the first carded continuous web one or several times. Similar also the second layer may comprise just one layer of the first carded continuous web or it may be multilayered. Also a multilayered second layer may be provided by folding the second carded continuous web one or several times.

According to an embodiment, the first and the second web are parts of the same web. In such an embodiment, the first web is present along one edge of the web in the machine direction, and the second web is present along the other edge of the web in the machine direction. By folding the web into zig-zag lamination, using a cross lapper (cf. e.g. FIG. 1 in EP 0 831 162), the first and second carded continuous webs may be arranged on top of each other, in two or more layers, to provide a layered structure. As the first and second webs are present along opposing edges of the web, they will not be uniformly arranged throughout the zig-zag laminate. One of the webs, in one or several layers, will be present at one side, e.g. the upper side, whereas the other will be present at the other side, e.g. the lower side, in one or several layers.

As both the first and second layer comprises bi-component binder fibers, a liner having a nonwoven wadding thermally bonded to nonwoven top layer may be obtained by heating the sandwich structure in a manner such that the binder portion of the bi-component binder fiber, e.g. the sheath of a core-sheath fiber, melts. The heating will thus not only result in formation of two thermally bonded non-wovens, but also in thermally bonding between the two non-wovens. In the thus obtained liner the wadding has a thickness of 4 to 140 mm, and a weight of 50 to 2800 g/m$^2$, such as 50 to 200 g/m$^2$. The top layer has a thickness of 0.05 to 4 mm, such as 0.05 to 2 mm, and a weight of 20 to 120 g/m$^2$, such as 50 to 100 g/m$^2$.

Various ways of a heating continuous web comprising bi-component binder fibers, e.g. core-sheath binder fibers, to form a thermally bonded nonwoven are known in the art. As an example, hot air blowing may be used. In order to control the thickness of the resulting liner, some pressure is typically applied to the sandwich structure during the heating step.

The pressure may be applied in various ways, such as by use of calendars arranged at a proper distance from each other, by transportation belts on each side of the material, or by compression molding.

The temperature to be used in the heating step depends on the staple fibers. It should be sufficient to melt the binder portion of the bi-component binder fiber, e.g. the sheath of a sheath-core fiber, but not other portion, e.g. the core of a sheath-core fiber. Further, the heat should also not melt the other staple fibers. In one embodiment, wherein the staple fibers are fibers of polyester, or copolymers thereof, and core-sheath polyester binder fibers, the heating temperature may be 160 to 210° C. As the process is for providing a liner as described herein, preferred fibers, ratio of fibers etc. provided for the liner are applicable also with respect to the process for manufacture thereof.

As already described, it may be advantageous to reduce the thickness of the top layer further by means of heated calendar(s). The process may thus comprise a further step of calendaring the heated layered structure with heated calendar(s). Especially when the top layer comprises somewhat thicker staple fibers, e.g. fibers having a linear mass density of more than 3 dtex, it may preferred to further reduce the thickness of the top layer by means of heated calendar(s). In one embodiment, wherein the staple fibers are fibers of polyester, or copolymers thereof, and core-sheath polyester binder fibers, the temperature of the heated calendar(s) may be set to 160 to 210° C., such as around 180° C.

Further, as already described, it may also be advantageous to include a step of perforating at least the top layer of the liner in the process to increase the flexibility of the top layer. The perforation may be performed by needle punching.

While the layered structure is heated to thermally bond the first and second layer, respectively, to form a nonwoven wadding thermally bonded to a nonwoven top layer, the layered structure, or the first and/or second continuous web, may also be mechanically bonded, such as by needle punching, prior to the heating. Thus, the process, according to an embodiment, further comprises the step of mechanically bonding, such as by needle punching, the layered structure prior to the heating. The needle punching step in such an embodiment is distinct from the optional perforation step, being performed subsequent to the heating. Alternatively, the process further comprises the step of mechanically bonding, such as by needle punching, the first and/or the second continuous web.

Exemplary Embodiment

In order to provide a liner as a described herein, a liner with a 0.2 mm/50 g/m² top layer and a 5 mm/100 g/m² wadding was provided by use of commercially available stable fibers. The mechanical properties for such layered material were similar to the ones of a separate meltspun top layer put on top of traditional carded wadding.

In providing the liner, staple fibers were obtained as standard bales for further processing at a carding facility. For the top layer, a fiber mixture of 90 wt % 1.7 dtex core-sheath polyester binder fibers and 10 wt % 0.7 dtex solid and mechanically crimped polyester fibers was used. For the wadding a fiber mixture of 15% 4.4 dtex core-sheath polyester binder fibers and 85% 8 dtex hollow conjugated (crimped in helical geometry) polyester fibers was used.

Two different carding facilities with slightly different machine configurations were used, both producing sandwich liner with identical fiber blends and similar properties fulfilling same test requirements.

One carding facility uses two different cards, combining the two different continuous webs to a sandwich material before a thermal bonding process. The other carding facility uses one carding machine fed by two different mixes of fibers arranging them substantially in two separate layers in a cross-lapper before entering the thermal bonding process.

The process starts by opening the bales, scaling and mixing fibers to specified proportions, carding fibers and arranging the carded continuous webs in two layers to specified surface weights, thermobonding of the sandwich material using hot air blowing though the material in combination with thickness calibration using a controlled surface pressure or controlled distance between two surfaces in the processing equipment.

Without further elaboration, it is believed that one skilled in the art may, using the preceding description, utilize the present invention to its fullest extent. The preceding preferred specific embodiments are, therefore, to be construed as merely illustrative and not limitative of the disclosure in any way whatsoever.

Although the present invention has been described above with reference to specific embodiments, it is not intended to be limited to the specific form set forth herein. Rather, the invention is limited only by the accompanying claims and, other embodiments than the specific above are equally possible within the scope of these appended claims, e.g. different than those described above.

In the claims, the term "comprises/comprising" does not exclude the presence of other elements or steps. Additionally, although individual features may be included in different claims, these may possibly advantageously be combined, and the inclusion in different claims does not imply that a combination of features is not feasible and/or advantageous.

In addition, singular references do not exclude a plurality. The terms "a", "an", "first", "second" etc. do not preclude a plurality.

The invention claimed is:

1. An upholstered piece of furniture comprising:
a furniture frame component;
a comfort material arranged on the furniture frame component; and
a liner arranged at least partly over the comfort material of the piece of furniture, said liner comprising a layered material with at least two layers, a first layer of a carded nonwoven wadding comprising staple fibers, and a second layer of a carded nonwoven top layer comprising staple fibers, the carded nonwoven wadding being thermally bonded to the carded nonwoven top layer, wherein the carded nonwoven wadding faces the comfort material, and wherein
said wadding has a thickness of 4 to 140 mm, and a weight of 50 to 2800 g/m²; at least 20 wt % of the staple fibers in the wadding have a linear mass density of at least 6 dtex; and 5 to 40 wt % of the staple fibers in the wadding are bi-component binder fibers; and
said top layer has a thickness of 0.05 to 4 mm, and a weight of 20 to 120 g/m²; at least 90 wt % of the staple fibers in the top layer have a linear mass density of 5 dtex or less; and 70 wt % to 100 wt % of the staple fibers in the top layer are bi-component binder fibers.

2. The upholstered piece of furniture according to claim 1, wherein said comfort material is selected from the group consisting of cellular polymeric foams, fibrous structures of man-made or natural fibers, pocket springs, and woven or knitted textile fabrics suspended in a frame.

3. The upholstered piece of furniture according to claim 1, wherein the liner is attached to the comfort material of the furniture.

4. The upholstered piece of furniture according to claim 1, wherein said bi-component binder fibers in the wadding are core-sheath binder fibers, and wherein said bi-component binder fibers in the top layer are core-sheath binder fibers.

5. The upholstered piece of furniture according to claim 4, wherein the thickness of the wadding is at least 5 times the thickness of the top layer.

6. The upholstered piece of furniture according to claim 1, wherein 85 wt % to 95 wt %, of the staple fibers in the top layer are bi-component binder fibers; and/or wherein 10 wt % to 25 wt % of the staple fibers in the wadding are bi-component binder fibers.

7. The upholstered piece of furniture according to claim 1, wherein at least 90 wt % of the staple fibers in the top layer have a linear mass density of 4 dtex or less.

8. The upholstered piece of furniture according to claim 1, wherein said top layer has a thickness of 0.1 to 2 mm; and/or a weight of 40 to 120 g/m².

9. The upholstered piece of furniture according to claim 1, wherein said wadding has a density of 5 to 20 kg/m³; and said top layer has a density of 40 to 400 kg/m³.

10. The upholstered piece of furniture according to claim 1, wherein the staple fibers in the wadding comprise fibers of polyester, or copolymers thereof, having a linear mass density of at least 6 dtex, and core-sheath polyester binder fibers, the fibers of polyester, or copolymers thereof, and the core of the core-sheath polyester binder fibers having a melting point of more than 200° C., and the sheath of the core-sheath polyester binder fibers having a melting point of less than 200° C.; and wherein the staple fibers in the top layer comprise core-sheath polyester binder fibers having a linear mass density of 5 dtex or less and optionally fibers of polyester, or copolymers thereof, having a linear mass density of 5 dtex or less the optional fibers of polyester, or copolymers thereof, and the core of the core-sheath polyester binder fibers having a melting point of more than 200° C., and the sheath of the core-sheath polyester binder fibers having a melting point of less than 200° C.

11. The upholstered piece of furniture according to claim 1, wherein the staple fibers in the wadding essentially consist of fibers of polyester, or copolymers thereof, and bi-component polyester binder fibers; and wherein the staple fibers in the top layer essentially consist of bi-component polyester binder fibers and optionally fibers of polyester, or copolymers thereof.

12. The upholstered piece of furniture according to claim 1, wherein at least 20 wt % the staple fibers in the wadding are conjugated fibers of polyester, or copolymers thereof, having a linear mass density of at least 6 dtex; and 85 wt % to 95 wt % of the staple fibers in the top layer are core-sheath polyester binder fibers.

13. The upholstered piece of furniture according to claim 1, wherein at least 50 wt % of the staple fibers in the wadding has a linear mass density of at least 7 dtex; and/or at least 95 wt % of the staple fibers in the top layer has a linear mass density of 4 dtex or less.

14. The upholstered piece of furniture according to claim 13, wherein at least 50 wt % of the staple fibers in the wadding have a linear mass density of at least 8 dtex; and/or at least 95 wt % of the staple fibers in the top layer has a linear mass density of 3 dtex or less.

15. The upholstered piece of furniture according to claim 1, wherein said wadding has a thickness of 4 to 50 mm and a weight of 50 to 200 g/m²; and said top layer has a thickness of 0.1 to 0.5 mm and a weight of 50 to 120 g/m²; and 85 wt % to 95 wt % of the staple fibers in the top layer are core-sheath polyester binder fibers; and at least 75 wt % of the staple fibers in the wadding have a linear mass density of at least 8 dtex.

16. The upholstered piece of furniture according to claim 1, wherein the top layer is perforated.

17. The upholstered piece of furniture according to claim 1, wherein the top layer is thermally bonded and mechanically bonded, such as by needle punching.

18. The upholstered piece of furniture according to claim 1, wherein the wadding is thermally bonded and mechanically bonded.

19. The upholstered piece of furniture according to claim 1, wherein a cover is arranged at least partly over the liner.

20. The upholstered piece of furniture according to claim 19, wherein the cover is permanently attached to the furniture, or wherein the cover is a slip dress on cover.

21. An upholstered piece of furniture comprising:

a furniture frame component;

a comfort material arranged on the furniture frame component; and a liner arranged at least partly over the comfort material of the piece of furniture, said liner comprising a layered material with at least two layers, a first layer of a carded nonwoven wadding comprising staple fibers, and a second layer of a carded nonwoven top layer comprising staple fibers, the carded nonwoven wadding being thermally bonded to the carded nonwoven top layer, wherein the carded nonwoven wadding faces the comfort material, and wherein said wadding has a thickness of 4 to 140 mm, and a weight of 50 to 2800 g/m²; at least 20 wt % of the staple fibers in the wadding have a linear mass density of at least 6 dtex; and 5 to 40 wt % of the staple fibers in the wadding are bi-component binder fibers, and wherein the wadding comprises multiple folded layers of a first carded continuous web; and said top layer has a thickness of 0.05 to 4 mm, and a weight of 20 to 120 g/m²; at least 90 wt % of the staple fibers in the top layer have a linear mass density of 5 dtex or less; and 70 wt % to 100 wt % of the staple fibers in the top layer are bi-component binder fibers.

* * * * *